Patented June 17, 1941

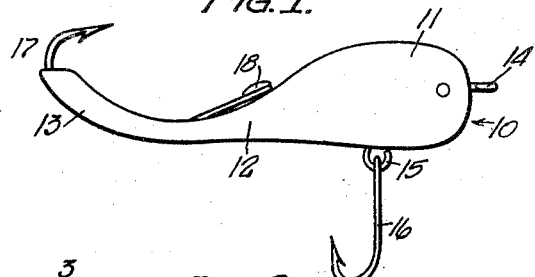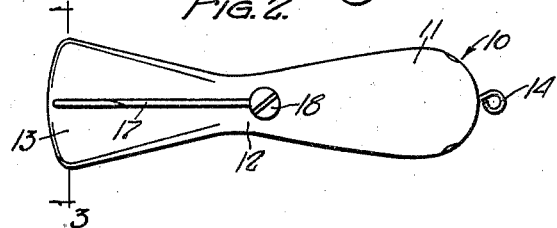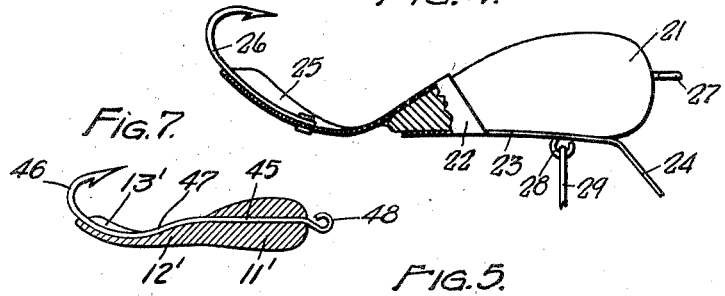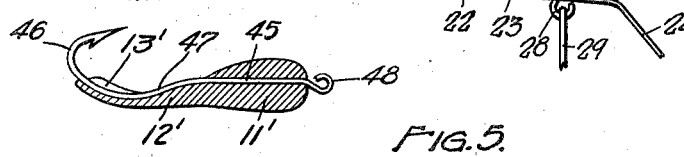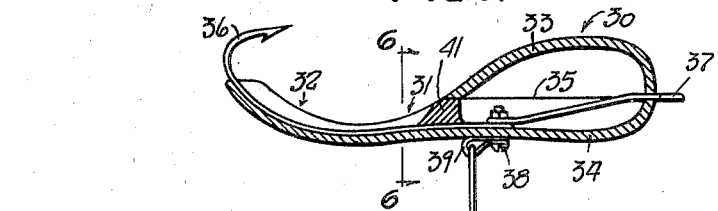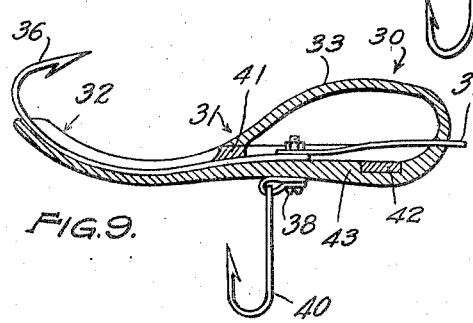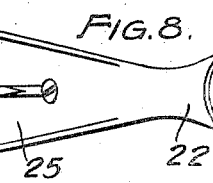

2,246,413

UNITED STATES PATENT OFFICE 2,246,413

FISHING LURE

Willis E. Haselwood, Elkhart, Ind.

Application March 19, 1938, Serial No. 196,812

14 Claims. (Cl. 43—46)

This invention relates to improvements in fishing lures.

The primary object of the invention is to provide a lure of novel construction and having a novel and attractive movement in the water, both when drawn through the water and when freely suspended on the end of a fishing line.

A further object is to provide a novel lure construction particularly adapted to be formed of molded material.

A further object is to provide a lure having a substantially cigar-shaped forward end portion having diving characteristics, and a flared concavo-convex tail portion of substantially the same length as said forward end portion.

A further object is to provide a lure having a forward end portion of substantially rounded cross section merging in a reduced dimension central portion positioned below the axis of the forward portion and terminating in a rearwardly upwardly and laterally curved flaring tail portion against which the shank of a fixed hook bears.

A further object is to provide novel means for securing line attaching means and a hook to a hollow fishing lure body.

Other objects will be apparent from the description and appended claims.

In the drawing:

Fig. 1 is a side elevation of the lure.

Fig. 2 is a top plan view of the lure.

Fig. 3 is a transverse sectional view taken on line 3—3 of Fig. 2.

Fig. 4 is a side elevation, of a modified embodiment of the invention, with parts broken away.

Fig. 5 is a longitudinal vertical sectional view of another modified embodiment of the invention.

Fig. 6 is a transverse sectional view taken on line 6—6 of Fig. 5.

Fig. 7 is a longitudinal vertical sectional view of an adaptation of the invention in a lure of fly rod size.

Fig. 8 is a top plan view of the embodiment illustrated in Fig. 4.

Fig. 9 is a longitudinal vertical sectional view of another embodiment of the invention.

Referring to the drawing, and particularly to Figs. 1 to 3 which illustrate the preferred embodiment of the invention, the numeral 10 designates the body of the fishing lure. Body 10 is preferably formed of molded plastic material such as cellulose nitrate, cellulose acetate, ethyl cellulose, vinyl acetate, or any other moldable material insoluble in water. The body 10 comprises a front portion 11 of substantially circular or any other desired cross section and preferably having a rounded front end. Body portion 11 tapers rearwardly inwardly and downwardly to form a reduced dimension intermediate body portion 12 whose lower surface extends substantially in the same plane as the lower surface of front body portion 11, though the lower surface of portion 11 may taper slightly upwardly and rearwardly and merge with intermediate portion 12 in a gentle curve as best illustrated in Fig. 1. A tail portion 13 flares laterally outwardly and rearwardly from intermediate body portion 12, said tail portion being comparatively thin and of substantially spoon-shape, with its upper surface concave both laterally and longitudinally. The rear edge of the tail is slightly curved and extends to a height approximately equal to the height or thickness of front body portion 11. The major width of the tail portion is preferably slightly greater than the width of front body portion 11.

A screw eye 14 at the front of body 10 forms means for attachment of a line. A screw eye 15 or any other suitable means is provided at the under side of body 10 intermediate its ends for pivotally mounting hook 16. A hook 17 having its shank fitting the longitudinal concavity of tail 13 of body 10 is fixedly secured to the body at the intermediate portion 12 thereof by means of a screw 18 or the like. Hook 17 extends longitudinally centrally of the lure body at the upper side thereof, with its barbed end in upwardly spaced return bent relation to tail portion 13.

The lure has a novel and attractive action in the water. The weight of the forward end thereof makes it an under-water lure, and serves, when the lure is drawn through the water, to give it somewhat of a diving action. The horizontal concavo-convex, flaring tail portion reacts with the water to impart lateral darting movement to the lure, coupled with a degree of lateral oscillation or rocking. The action is thus quite similar to the movement of a swimming fish. Line attachment member 14 is preferably positioned substantially at or slightly above the longitudinal axis of body portion 11, and this, coupled with the positioning of at least the major portions of the intermediate and tail portions of the body 10 below the line of draft, serves to substantially prevent spinning or rotation of the lure in the water. Thus the fixed rear hook 17 is always so positioned that a fish striking the rear of the lure will be impaled at its upper cartilagenous jaw. When the lure is in the water and no pull is exerted on the line, the lure settles or sinks with a life-like action combining diving action and lateral darting and oscillation.

Where a comparatively inexpensive lure construction is desired, the embodiment illustrated in Fig. 4 may be provided. In the construction the head 21 is formed of wood or other suitable material, and is shaped substantially the same as head portion 11 of the preferred embodiment. A sheet metal member is secured to head 21 and comprises an intermediate socket portion 22 receiving the rear reduced portion of head 21. A plate portion 23 extends forwardly from socket portion 22 at the inner side of head 21. Plate portion 23 terminates in a forwardly downwardly inclined deflecting flange portion 24 projecting below the front of the head 21. A rearwardly flaring concave spoon portion 25 projects rearwardly from the upper portion of socket 22 in the same relation as tail portion 13 of the preferred embodiment. A hook 26 is fixedly secured to tail portion 25 with its shank extending centrally and longitudinally of said tail portion, and its barb in upwardly spaced return bent relation to said tail portion. A line attaching screw eye 27 is mounted at the front of the head at or above the longitudinal axis of said head. A screw eye 28 pivotally mounts a hook 29, said screw eye passing through portion 23 and into head 21.

This modified embodiment of the invention is normally an underwater lure, and has substantially the same diving, darting and oscillating movement as the preferred embodiment when drawn through the water, by virtue of diving flange 24. When the pull on the line is released, however, the lure will rise to the surface, head foremost, in a laterally oscillating movement. It will be noted that, by virtue of the reception of head 21 in socket 22, the single securing member 28 is all that is required to hold the head and sheet metal parts in operative assembled relation.

Figs. 5 and 6 illustrate another modified embodiment of the invention, wherein the lure body is molded from plastic material and a portion thereof is hollow to reduce cost. The lure body comprises head, intermediate and tail portions 30, 31 and 32, respectively, of the same shape, proportions and relation as in the preferred embodiment of the invention. The lure body is formed of upper and lower concave molded parts, 33 and 34, respectively, which are cemented together at their edges along the plane 35 which is preferably above the height of the reduced intermediate portion 31. The lower part 34 comprises the bottom of head portion 30, and all of the intermediate and tail portions, the front portion being substantially cup-shaped for registry with the edges of the upper part 33. A slot is formed centrally in the rear upwardly directed wall of the front portion for reception of the shank of a hook 36 which bears against the intermediate and tail portions of the lure to terminate in a barb above and adjacent the rear end of the lure. The forward end or eye of the hook is positioned within the hollow head portion 30 of the lure. An elongated draft member 37 having eyes at its opposite ends projects through the front of the head at the plane 35 between the upper and lower parts. A screw 38 extending through the bottom wall of head portion 30 serves to fixedly secure the hook 36 and draft member 37 in operative relation to the body. Screw 38 also secures a mounting 39 for a hook 40 to the body exteriorly thereof. A plug 41 fits in and is cemented to the slot receiving hook shank 36 to render the hollow head portion water tight, and a water tight seal may be provided around the portion of draft member 37 projecting through the body, and around screw 38, as by the use of a cement or other sealing means.

The characteristics of this embodiment of the lure may be varied by controlling the thickness of the walls of the hollow head portion, or by other obvious means, such as weights 42. Thus, if it is desired to have an under-water bait, the walls may be thick as at 43 and the body weighted, while thin walls will provide a surface or buoyant bait. Obviously the action of the lure will depend in part upon these or other physical characteristics. Thus a non-buoyant bait will have the same diving, darting and oscillating action above described with reference to the preferred embodiment, while a buoyant bait will have only the darting and oscillating characteristics.

The adaptation of this invention in a lure of fly rod size is illustrated in Fig. 7. This construction is substantially the same as in the preferred embodiment with respect to the material from which the body is formed, and the relative proportions and shapes of the head portion 11', intermediate portion 12', and tail portion 13'. However, the small size of the lure body makes possible the imbedding of the elongated shank 45 of hook 46 in the head portion 11', with the exposed portion 47 of said shank following the curvature of the upper surface of the lure body at the intermediate and tail portions of the body. The construction is thus rendered simple and inexpensive to manufacture, and has a minimum number of parts by reason of the projection of the eye 48 of the hook from the front end of the body portion, thus providing line attachment means. The action of this fly rod size lure is the same as that of the preferred embodiment illustrated in Fig. 1 and described above

I claim:

1. A fishing lure body comprising a plug type head, an intermediate portion and a tail portion, said intermediate portion being of reduced cross sectional dimension and disposed below the longitudinal axis of said head, said tail portion flaring laterally and curving upwardly from said intermediate portion and being generally of concavo-convex form with its concave face uppermost.

2. A fishing lure body comprising a plug type head merging with a reduced dimension intermediate portion from which a substantially spoon-shaped tail projects in laterally flaring relation, said tail having a concave dished upper face, said intermediate portion being disposed below the axis of said head.

3. A fishing lure body comprising a plug type head whose sides and upper face taper rearwardly and merge in a laterally flaring thin tail portion which curves rearwardly and upwardly and is of substantially the same length as said head.

4. A fishing lure body having a rearwardly tapering plug-shaped forward end portion from which a substantially spoon-shaped rearwardly flaring tail portion projects, said tail portion having a spoon-like concave upper face and being of substantially the same length as said forward end portion.

5. A fishing lure body as defined in claim 4 wherein the longitudinal center line of the body constitutes a vertical reverse curve.

6. A fishing lure body as defined in claim 4, and a hook fixed to said body with its shank curved and substantially conforming to the upper surface of said tail portion and its pointed end terminating thereabove.

7. A fishing lure comprising a body having a plug type head portion whose upper and side surfaces taper rearwardly and a thin tail portion of substantially the same length as said head portion flaring laterally and curving rearwardly and upwardly from said head portion, line attaching means at said head portion, and a hook fixed to said body with its shank extending centrally of and curved to conform to the curvature of the upper surface of said tail portion.

8. A fishing lure comprising a body, a spoon shaped tail having a socket receiving the rear of said body, and means for securing said tail to said body, said last named means also mounting a hook.

9. A fishing lure comprising a body, a tail having a socket receiving the rear of said body and flaring laterally from said socket in concavo-convex form, and means for securing said tail to said body, said tail and body being of substantially the same length.

10. A fishing lure comprising a body, a tail member projecting rearwardly from said body and including a socket fitting over the end of said body and a forward extension terminating in a downwardly inclined flange adjacent the front of said body, and a securing member connecting said body and extension.

11. A fishing lure comprising a buoyant body, a concavo-convex plate flaring rearwardly from said body, said plate having a socket into which the end of said body fits and a forward extension secured to the under side of the body and terminating in a downwardly inclined diving plate, line attaching means secured to said body, and a hook fixed to said plate with its shank extending longitudinally and centrally of said plate.

12. In a fishing lure, a unitary member comprising an intermediate portion including a socket adapted to receive a portion of a bait body, a downwardly inclined forward portion, and a concavo-convex tail at its rear portion.

13. In a fishing lure, a body, and an elongated member secured to the under side of said body, said member including a diving plate at its front end and an upwardly curved tail projecting rearwardly of said body and of an area at least twice the area of said diving plate.

14. A fishing lure as defined in claim 13, wherein said member constitutes a keel for said body, and said tail is substantially spoon-shaped and of a length substantially equal to the length of said body.

WILLIS E. HASELWOOD.